July 2, 1940.    J. HARDWICK ET AL    2,206,091
ALTERNATING CURRENT RECTIFIER
Filed July 13, 1937

INVENTORS
JOHN HARDWICK
ROY BLYTHEN
ERIC LAWRENCE CASLING WHITE
BY H. S. Grover
ATTORNEY Patented July 2, 1940

2,206,091

UNITED STATES PATENT OFFICE 2,206,091

ALTERNATING CURRENT RECTIFIER

John Hardwick, West Drayton, Roy Blythen, Hayes, and Eric Lawrence Casling White, Hillingdon, England, assignors to Electric & Musical Industries Limited, Hayes, Middlesex, England, a company of Great Britain Application July 13, 1937, Serial No. 153,334
In Great Britain July 13, 1936

8 Claims. (Cl. 175—363)

This invention relates to alternating current rectifiers.

In the usual form of rectifier employing thermionic valves of the vacuum or gas discharge type, the output is dependent upon the voltage of the alternating current input and if the voltage of the input varies, a variation of the output occurs. Consequently, if a constant output is required the alternating current rectifiers as heretofore employed are not satisfactory.

It is the chief object of the present invention to provide an improved alternating current rectifier in which provision is made whereby the output is maintained constant or substantially constant despite variations in the alternating current input.

A further object of the invention is to provide an improved rectifier in which the output voltage of the rectifier may be readily controlled independently of the input voltage.

A still further object of the invention is to provide an improved rectifier, in which the resistance of the transformer windings does not appear as regulation resistance.

According to the invention an alternating current rectifier is provided comprising two or more grid-controlled gas discharge rectifying valves or an equivalent multi-electrode device or the like so connected to the load through a choke of sufficient inductance to supply a continuous current and means for applying alternating current voltages to the anodes and for applying a direct current bias and an alternating current potential to the grids of the valves, the alternating potential for each grid being obtained from the same source as the alternating anode potential and the alternating potential on each grid lagging the potential on the associated anode by an amount so chosen that variations of alternating anode potential, as for example, due to variations of pressure in supply mains, are accompanied by such alterations of alternating grid potentials as to maintain the rectifier output voltage substantially constant.

The invention may be applied to full-wave rectifiers operating from a single phase supply, or half-wave or full-wave rectifiers operating for a polyphase supply.

Figure 1:
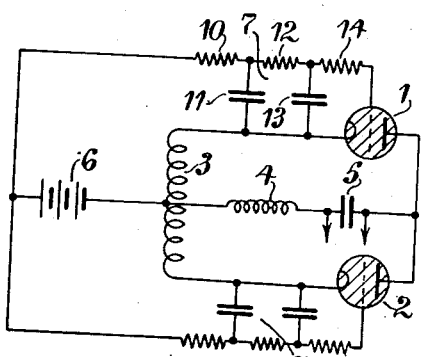
Figure 3:
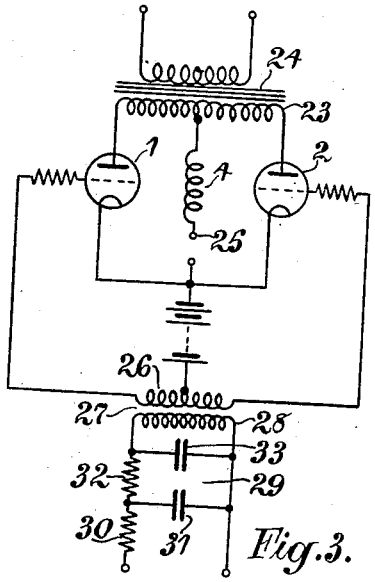
Figure 2:
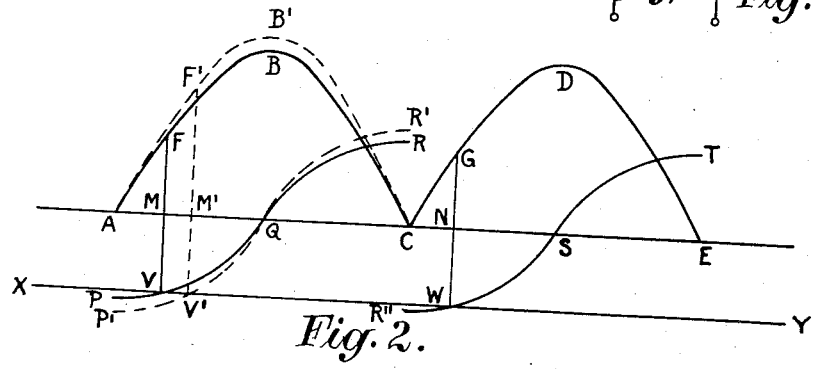
Figure 4:
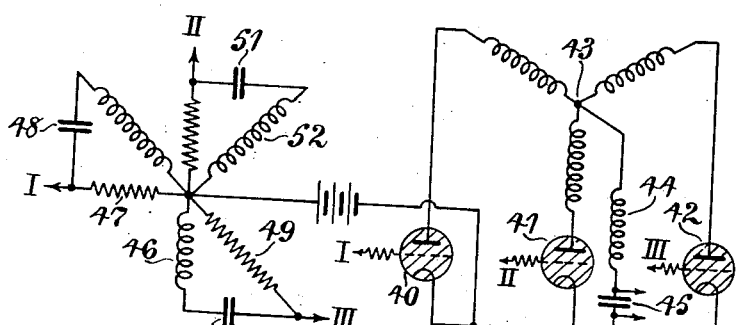

The nature of the invention and the manner in which the same is to be performed will be readily understood from the accompanying description in detail, reference being made to the accompanying drawing in which:

Figure 1 is a diagram of a circuit for a full-wave rectifier operating from a single phase supply, Figure 2 is a diagram illustrating the principle of the invention, Figure 3 is a diagram of a circuit arrangement which is alternative to that shown in Figure 1, and Figure 4 is a diagram illustrating the application of the invention to a three phase rectifier operating from a three phase supply.

Referring to Figure 1 of the drawing it will be seen that the arrangements therein shown is a double wave rectifier arrangement comprising two gas discharge valves 1 and 2, arranged with their cathodes connected to the secondary winding 3 of a transformer, of which the primary is not shown but, which is connected to a suitable A. C. supply. The winding 3 is centre tapped and is coupled by a choke 4, through a condenser 5 to the anodes of valves 1 and 2.

The grids of valves 1 and 2 are fed with alternating potential from winding 3 through biasing battery 6 and delay networks 7 and 8 respectively, the delay networks being similar and each being formed of series resistance elements with capacity elements in shunt. The delay networks may each be formed of two resistance capacity combinations such as 10, 11 and 12, 13, giving a total delay of 90°.

The delay network in each case is preferably connected to associated grid through a resistance such as 14 to limit grid current to a small value.

The operation of this arrangement will be readily understood from the following description with reference to Figure 2 of the drawing. In this figure curves A B C and C D E represent the positive half-waves of the potentials applied to the valves 1 and 2 respectively; for example the half-wave A B C may be assumed to be applied to the anode of valve 1 and the half-wave C D E may be assumed to be applied to the anode of valve 2. The anode of valve 2 will be negative when the anode of valve 1 is positive and vice-versa, so that the two half-waves are correctly represented as occurring successively in the periodic interval or time of a full-wave represented by the horizontal distance A E.

The curves P Q R and R″ S T represent the variations of the grid potential of valves 1 and 2 respectively during the intervals for which the anodes are positive it being assumed that the grids are unbiased and that the anode potential of each valve leads the grid potential by 90°. The line X Y is drawn at a distance below the zero line A E, corresponding to the positive bias applied to the grids of valves 1 and 2. Where the grid potential wave lines intersect this line X Y, namely at the instants represented by points V and W, the grid potential of the appropriate valve will be zero, and the distance between X Y and the curves P Q R and R″ S T will give the actual grid potential of one or other of the valves at the corresponding instant of time.

In the following discussion it is assumed that the amplification factor of each valve is so large that the valve is practically unable to conduct unless the grid voltage is zero or positive.

Thus considering the operation of the valve 1 during the period represented by the distance A C, it will be seen that at the instant A when the anode potential of the valve becomes positive, as the grid potential remains negative, the valve will not become conducting, and will remain nonconducting till the instant that the grid potential falls to the value zero represented by V along the line X Y and by the point M along the line A E. From the instant corresponding to the point M to the instant corresponding to the point C the valve will continue to conduct, and provided as is well known that the value of the choke 4 by which the rectifier is coupled to the load is sufficiently large, the valve 1 will continue to conduct till the valve 2 begins to operate.

The valve 2 will begin to operate during the succeeding half-wave period to that in which the valve 1 begins to operate, when the grid potential assumes a value given by the point of intersection W of curve R″ S T and line X Y. If the valves are properly balanced the perpendicular W N to the line A E, cutting A E at N, and cutting the curve C D E in G will be identical with the line V M F in every respect and separated therefrom by a distance corresponding to a half-wave period. Thus the anode voltage of valve 1 changes in phase by an amount 180° or $\pi$ radian before the valve 2 conducts. Similarly the valve 2 will operate while its anode voltage changes in phase by an amount $\pi$ radians.

Thus assuming that a simple harmonic voltage $E \sin \theta$ is applied to the valve anodes, and that the phase angle of the voltage when a valve becomes conductive is $\theta'$, then the average potential V applied by the valve to the load will be $$V = \int_{\theta'}^{\pi+\theta'} \frac{1}{\pi} E \sin \theta = \left[ \frac{-E}{\pi} \cos \theta \right]_{\theta'}^{\pi+\theta'} = \frac{2E}{\pi} \cos \theta'$$

If both valves are properly matched and since when the valve ceases to conduct the other commences to conduct the expression for V given above will represent the average D. C. potential applied to the load.

It will be seen from this expression, that if $\theta'$ is varied the average potential applied to the load will vary. Referring to Figure 2 it will be seen that the value of $\theta'$ depends on the position of the line X Y, i. e. the value of $\theta'$ depends on the value of the positive grid bias applied to each valve. For example if the value of the positive grid bias is increased so that the line X Y intersects the curve P Q R' in P, then valve 1 will begin to conduct as soon as the anode potential becomes positive, and the value of the average potential applied to the load would be given by $$V = \frac{2E}{\pi}$$

Thus it is clear that by varying the positive grid bias applied to the valves, the output of the arrangement can be varied. This property of hot cathode grid-controlled gas discharge valves is already known.

Now according to the invention the arrangement is made to deliver a substantially constant output notwithstanding variations in the supply voltage. For example, again referring to Figure 2, the dotted curve A B' C indicates a variation in the applied anode voltage. The corresponding grid voltage curve will be the curve P' Q R'. This latter curve intersects the line X Y in V' and the line V' M' F″ will now represent the instant at which the valve becomes conductive. It will be seen from the figure that the phase angle of the voltage applied to the anode of the valve at the time when the valve becomes conductive has been increased due to the change in grid voltage. Thus if the changed voltage is $E' \sin \theta$, and the new phase angle at which the valve becomes conductive is $$\theta'_i$$

then the output voltage will be represented by $$\frac{2E'}{\pi} \cos \theta'_i$$

Now $E' > E$ but $$\theta'_i > \theta'$$

so that $$\cos \theta'_i < \cos \theta'$$

thus the increase in the phase angle from $$\theta' \text{ to } \theta'_i$$

at which the valve becomes conductive will at least partially compensate for the increase in the supply voltage E to E'.

The theoretical condition for which exact compensation may be obtained may be established as follows:

Assuming that the A. C. voltage applied to the grid of a valve is a proportion $a$ of the A. C. voltage applied to the anode, and that the phase delay of the grid volts with respect to the anode volts is $\phi$, then the A. C. grid voltage will be given by $$v = a E \sin (\theta - \phi)$$

Now when the valve conducts the condition obtains that $$\mu(v + B) + E \sin \theta' = 0$$

where B is the fixed bias voltage applied to the grid.

Thus substituting for $v$, we have $$\mu a E \sin (\theta' - \phi) + E \sin \theta' + \mu B = 0$$

Now the condition for no variation of output voltage with mains voltage is that $$\frac{dV}{dE} = 0$$

Now we have seen above that $$V = \frac{2E}{\pi} \cos \theta'$$

Thus $$dV = \frac{2E}{\pi} \cos \theta' dE - \frac{2E}{\pi} \sin \theta' d\theta'$$

Now it has also been shown above that $$\mu a E \sin(\theta'-\phi) + E \sin \theta' + \mu B = 0$$

Thus $$\frac{d\theta'}{dE} = -\frac{1}{E}\frac{\mu a \sin(\theta'-\phi) + \sin \theta'}{\mu a \cos(\theta'-\phi) + \cos \theta'}$$

and thus $$\frac{dV}{dE} = \frac{2}{\pi}\cos \theta' + \frac{2}{\pi}\sin \theta' \frac{\mu a \sin(\theta'-\phi) + \sin \theta'}{\mu a \cos(\theta'-\phi) + \cos \theta'}$$

which is required to be zero
i. e.

$$\cos^2 \theta' + \mu a \cos \theta' \cos(\theta'-\phi) + \sin^2 \theta' + \mu a \sin \theta' \sin(\theta'+\phi) = 0$$

$$\mu a [\cos \theta' \cos(\theta'-\phi) + \sin \theta' \sin(\theta'-\phi)] = -1$$

$$\therefore \cos \phi = -\frac{1}{\mu a}$$

$$\therefore \phi = 90° + \sin^{-1}\frac{1}{\mu a}$$

Thus if the applied alternating grid voltage lags the applied alternating anode voltage by 90°

$$+ \sin^{-1}\frac{1}{\mu a} (\doteqdot 90° \text{ if } \mu a \text{ is large})$$

the output voltage will be substantially constant notwithstanding small changes in the applied anode voltage.

It will be appreciated that since the phase change afforded by resistance-capacity combinations such as 10, 11 and 12, 13 shown in Figure 1 will alter slightly if the frequency of the applied current varies and in addition, quick amplitude changes of applied current will not be applied instantaneously to the control grids in direct proportion it is advantageous to avoid the use, if possible, of resistance-capacity combinations. If, therefore, a full-wave rectifier is employed for rectifying current from one phase of a three phase supply, the phase shifting networks of Figure 1 may be replaced by a Scott connection to afford the 90 degrees phase change. Other means may be used for affording the required phase change.

With the arrangement shown in Figure 1 an additional advantage accrues since if an increased load tends to cause a fall in voltage due to the resistance of the transformer winding 3, the circuit compensates in a similar manner to the compensation which occurs due to a variation in the mains voltage, since as shown, the grid voltage is derived from the same winding as that supplying the anode potential. Thus the effective regulation resistance will be merely the resistance of the choke 4.

In the case where advantage is to be taken of zero regulation resistance feature of an arrangement according to the invention, as for example where several amplifiers are to be run from a common supply rectifier, separate chokes should be used in each supply lead, each choke being large enough to take the appropriate load current.

In some cases, however, the varying grid potentials may be derived from a separate transformer. For example as shown in Figure 3, the anodes of the two valves 1 and 2 may be connected to the ends of the secondary winding 23 of a transformer 24 and the choke 4 connected between a centre tapping of the winding and an output terminal such as 25, whilst the grids of the two valves may be connected to the ends of the secondary winding 26 of another transformer 27, the primary 28 of which may be associated with a delay network 29 formed of resistance-capacity combinations 30, 31 and 32, 33 similar to the delay networks 7 and 8 of Figure 1. In this arrangement however since the varying grid potentials are not derived by the winding supplying the anode potentials, compensation for an increased load due to a fall in voltage due to the resistance of the transformer winding as aforesaid does not occur.

Figure 4 of the drawing illustrates an example of a half-wave rectifier constructed in accordance with the invention for rectifying a three phase supply. As shown, three gas discharge valves 40, 41 and 42 are employed, the anodes of the valves being connected respectively to the windings of a star connected secondary 43 of a transformer, the star point being coupled by a choke 44, through a condenser 45 and the load which is connected across the condenser 45 to the cathodes of the valves. In this construction a phase delay between the anode and grid voltages of approximately 120 degrees is the optimum for compensation purposes and the phase change in the example shown is derived from an additional star connected winding indicated by reference numeral 46 affording a delay of 180 degrees, each limb of the winding being associated with resistance-capacity combinations comprising respectively resistance 47 and condenser 48, resistance 49 and condenser 50, and resistance 51 and condenser 52, for the purpose of advancing the phase 60 degrees, the midpoints of the resistance-capacity combinations being connected respectively to the control grids of the valves 40, 41 and 42 by way of the leads I, II and III of which only the ends are shown in the drawing.

In the case of the arrangement of Figure 4, the expression for the angle of lag between the applied anode and grid voltages in each tube at which the output voltage will be substantially independent of changes in input voltage is $$\phi = 120° + \sin^{-1}\frac{\sqrt{3}}{2\mu a}$$

Whilst resistance-capacity combinations have been shown for affording the required phase change other means may be used. For example voltages from different phases of the polyphase supply may be employed.

The polarising potential which is applied to the control grids of the valves is adjusted to afford the required output and since the alternating potential applied to the control grids of the valves, lags the alternating potential applied to the anodes of the valves, compensation for variations in the applied potential will be obtained tending to mantain the output substantially constant.

It will be readily appreciated that the arrangements shown in Figs. 1 and 3 would function equally if the valves 1 and 2 were replaced by a combination of electrodes in a single housing, for example a mercury pool rectifier with a single cathode and two control grids each associated with an anode. Similarly in the three-phase rectifier of Fig. 3 a multi-electrode arrangement equivalent to the three valves 40, 41 and 42 might be used. Thus it will be realised that the invention is applicable to arrangements including multi-electrode devices which are each equivalent to a plurality of valves.

We claim:

1. An alternating current rectifier comprising in combination a pair of grid controlled gas discharge rectifying valves, an output circuit for said valves including a common portion, a choke in the common portion of said output circuit, the inductance of said choke being sufficient to cause said valves to supply a continuous current, a load connected in the common portion of said output through said choke, supply means for applying alternating current potential to the anodes of said valves, circuit means connected with said supply means for applying alternating potentials to the grids of said valves and means for applying a fixed bias potential to the grids of said valves, said circuit means including phase shifting means for shifting the phase of the alternating potential applied to the grid of each valve by a fixed amount with respect to the plate potential so as to cause the same to lag the alternating voltage applied to the anode of the valves by a predetermined fixed amount, such that variations of alternating anode potential, as for example, due to variations of pressure in the supply mains are accompanied by such alterations in the amplitude of the alternating grid potentials as to maintain the rectifier output voltage substantially constant.

2. An alternating current rectifier comprising in combination two grid controlled gas discharge rectifying valves, a choke in the output circuit thereof the inductance of said choke being sufficient to cause said valves to supply a continuous current, a load connected in the output through said choke, single phase supply means for applying alternating current potentials to the anodes of said valves, means associated with said supply means for applying alternating potentials to the grids of said valves, and means for applying bias potential to the grids of said valves, the alternating potential applied to the grid of each valve being caused to lag the alternating voltage applied to the anode of the valves by a phase angle substantially equal to $$90° + \sin^{-1}\frac{1}{\mu a}$$

where $a$ is the ratio of the applied alternating grid voltage to the applied alternating anode voltage in each tube and $\mu$ is the control ratio factor of each tube.

3. An alternating current rectifier comprising in combination three grid controlled gas discharge rectifying valves having a common output circuit, a choke in the output circuit the inductance of said choke being sufficient to cause said valves to supply a continuous current, a load connected in the output through said choke, three phase supply means for applying alternating current potentials to the anodes of said valves, circuit means connected with said supply means for applying alternating potentials to the grids of said valves, and means for applying bias potential to the grids of said valves, said circuit means including phase shifting means for shifting the phase of the alternating potential applied to the grid of each valve so that it lags the alternating voltage applied to the anode of the valves by phase angle substantially equal to $$120° + \sin^{-1}\frac{\sqrt{3}}{2\mu a}$$

where $a$ is the ratio of the applied alternating grid voltage to the applied alternating anode voltage in each tube and $\mu$ is the control ratio factor of each tube.

4. An alternating current rectifier system comprising a pair of grid controlled gas discharge rectifying tubes, a load, means for connecting the tubes to the load comprising a choke of sufficient inductance to supply a substantially continuous current and means for applying alternating current voltages to the anodes of said tubes, means for applying a constant direct current bias, means for applying an alternating voltage to the grids of the tubes with respect to the cathode of each thereof, the alternating potential for each grid being obtained from the same source as the alternating anode voltage and the alternating voltage on each grid lagging the potential on the associated anode by a fixed amount such that variations of alternating anode voltage as, for example, variations of the voltage in the supply mains, are accompanied by such alterations of alternating grid voltage as to tend to maintain the rectifier output voltage substantially constant.

5. An alternating current rectifier system as described in the next preceding claim arranged for full wave operation off a single phase supply comprising a pair of grid controlled gas discharge tubes having the alternating voltage applied to the grids delayed in phase in respect to the alternating voltages applied the respective anode circuits by an angle substantially equal to $$90° + \sin^{-1}\frac{1}{\mu a}$$

where $a$ is the ratio of the applied alternating grid voltage to the applied alternating anode voltage in each tube, and $\mu$ is the control ratio factor of each tube, the angle of delay being substantially equal to 90° where the control ratio factor of the tube is large.

6. An alternating current rectifier system according to claim 4 for operation off a three phase supply comprising, three grid controlled gas discharge tubes operating one off each phase of the supply having the alternating current potentials applied to the grids delayed in phase in respect to the alternating voltages applied to the respective anodes by an angle substantially equal to $$120° + \sin^{-1}\frac{\sqrt{3}}{2\mu a}$$

where $a$ is the ratio of the applied alternating grid voltage to the applied alternating anode voltage in each tube, and $\mu$ is the control ratio factor of each tube, the angle of delay being substantially equal to 120° where the control ratio factor of the tube is large.

7. In an alternating current rectifier system such as described in claim 4, a transformer winding from which is derived the alternating voltage applied to each grid of the tubes and the anode current of the tubes, said transformer being arranged so that when the load current of the rectifier system changes the change in the grid voltage due to the resistance and reactance of the transformer winding substantially compensates for the effect of said resistance and reactance on the anode voltage.

8. In an alternating current rectifier system as described in claim 4, means for controlling the output voltage of the rectifier system comprising means for varying the direct current bias applied to the grids of the said gas discharge tubes.

JOHN HARDWICK.
ROY BLYTHEN.
ERIC LAWRENCE CASLING WHITE.